United States Patent
Wang et al.

(10) Patent No.: US 11,117,614 B2
(45) Date of Patent: Sep. 14, 2021

(54) REAL-TIME STABILITY MONITORING IN STEERING SYSTEMS

(71) Applicant: STEERING SOLUTIONS IP HOLDING CORPORATION, Saginaw, MI (US)

(72) Inventors: Qi Wang, Saginaw, MI (US); Tejas M. Varunjikar, Rochester Hills, MI (US); Anthony J. Champagne, Saginaw, MI (US); Michael K. Hales, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 90 days.

(21) Appl. No.: 15/717,149

(22) Filed: Sep. 27, 2017

(65) Prior Publication Data
US 2018/0086371 A1    Mar. 29, 2018

Related U.S. Application Data

(60) Provisional application No. 62/400,806, filed on Sep. 28, 2016.

(51) Int. Cl.
*B62D 6/00*    (2006.01)
*B62D 5/04*    (2006.01)

(52) U.S. Cl.
CPC ............. *B62D 6/00* (2013.01); *B62D 5/0457* (2013.01); *B62D 5/0463* (2013.01); *B62D 5/0481* (2013.01)

(58) Field of Classification Search
None
See application file for complete search history.

(56) References Cited

U.S. PATENT DOCUMENTS

2001/0041957 A1* 11/2001 McCann ................ B62D 6/003
    701/41
2002/0129988 A1* 9/2002 Stout ...................... B62D 6/008
    180/400

(Continued)

FOREIGN PATENT DOCUMENTS

CN        105209320 A    12/2015
CN        105292242 A    2/2016

(Continued)

OTHER PUBLICATIONS

German Office Action from the German Patent and Trademark Office for related German Patent Application No. 102017122168.9 dated Nov. 5, 2020, English Translation Included.

*Primary Examiner* — Christian Chace
*Assistant Examiner* — Katherine Marie Fitzharris
(74) *Attorney, Agent, or Firm* — Dickinson Wright PLLC

(57) ABSTRACT

A method for scaling a stability signal in a steering system is provided and includes computing, by a torque boost module, an assist torque command to cause a motor of the steering system to generate an assist torque. Further, the method includes computing, by a stability compensation module, a stabilized torque command based on an input signal, the stabilized torque command modifying the assist torque command. Further, the method includes computing, by a stability monitoring module, a stability scaling factor to adjust the stabilized torque command based on a duration and severity of an instability detected in the input signal.

16 Claims, 12 Drawing Sheets

(56) References Cited

U.S. PATENT DOCUMENTS

| | | | |
|---|---|---|---|
| 2005/0257987 A1* | 11/2005 | Bohm | B62D 5/06 |
| | | | 180/419 |
| 2008/0147276 A1* | 6/2008 | Pattok | B62D 5/0472 |
| | | | 701/42 |
| 2015/0191199 A1* | 7/2015 | Tsubaki | B62D 15/025 |
| | | | 701/42 |
| 2016/0121925 A1* | 5/2016 | Lazic | B62D 15/025 |
| | | | 701/41 |
| 2016/0129935 A1 | 5/2016 | Akatsuka et al. | |
| 2017/0282929 A1* | 10/2017 | Sakaguchi | B60W 10/08 |
| 2017/0282972 A1* | 10/2017 | Moretti | B60W 50/04 |
| 2018/0065661 A1* | 3/2018 | Kim | B62D 5/0472 |

FOREIGN PATENT DOCUMENTS

| | | |
|---|---|---|
| EP | 2221235 A2 | 8/2010 |
| EP | 2995531 A1 | 3/2016 |
| WO | 2016055719 A1 | 4/2016 |

\* cited by examiner

REAL-TIME STABILITY MONITORING IN STEERING SYSTEMS

CROSS-REFERENCES TO RELATED APPLICATIONS

This patent application claims priority to U.S. Provisional Patent Application Ser. No. 62/400,806, filed Sep. 28, 2016, which is incorporated herein by reference in its entirety.

BACKGROUND

This application generally relates to electric power steering (EPS) system in the vehicle and particularly to implementing real-time stability monitoring and gain scaling by the EPS.

An EPS system is used in a majority of passenger cars today. The EPS assists a driver to steer the vehicle in desired direction. Typically, the EPS system is a closed loop control system and hence, it is important to ensure stability of the system to ensure the driver is able to steer the steering wheel to the desired position without unintended vibrations.

Typically, an EPS system is a closed loop control system and hence, it is important to ensure stability of the system. In case of the EPS system, as is generally known, two parts affecting overall process dynamics include controls and plant. The calibration of the controls can change with vehicle speed, handwheel torque, motor velocity etc. Furthermore, the plant dynamics can be affected by system friction, vehicle speed, temperature, nonlinearities etc. When these conditions change, the system transfer function changes too. Hence, an EPS stability correlation process is used to determine minimum required stability margin at various operating points. Although the stability margins are checked at multiple operating points, the stability correlation assumes a non-variant linear EPS plant model. Further, control calibration assumes a non-variant linear EPS response. It is technically challenging and time consuming to study and cover multiple, and possibly all, factors affecting stability in practice. Accordingly, a borderline margin determination from a stability correlation process serves as a guideline while designing desired control calibrations of an EPS system. Although this design approach is useful for creating a system with appropriate stability, it is desirable to have, a real-time, active stability monitoring method (in addition to existing stability correlation process) to ensure stability of the EPS system while driving.

SUMMARY

According to one or more embodiments described, a steering system includes a torque boost module that computes an assist torque command. Further, the steering system includes a stability compensation module that computes a stabilized torque command based on one or more sensor measurements, the stabilized torque command modifying the assist torque command. Further, the steering system includes a stability monitoring module that computes a stability scaling factor to adjust the stabilized torque command based on a duration and severity of an instability detected in the sensor measurements.

According to one or more embodiments, a real-time stability monitoring system for a steering system includes a filtering module that computes a filtered input signal from an input signal that is used to determine an assist torque command and magnitude of an instability in the input signal from the filtered input signal. Further, a duration module determines a duration of the instability. Further, a magnitude module determines a severity of the instability. Further yet, an assist scale factor module determines a stability scaling factor to adjust the assist torque command of the steering system based on the duration and the severity of the instability in the input signal.

According to one or more embodiments, a method for scaling a stability signal in a steering system includes computing, by a torque boost module, an assist torque command to cause a motor of the steering system to generate an assist torque. Further, the method includes computing, by a stability compensation module, a stabilized torque command based on an input signal, the stabilized torque command modifying the assist torque command. Further, the method includes computing, by a stability monitoring module, a stability scaling factor to adjust the stabilized torque command based on a duration and severity of an instability detected in the input signal.

In one or more examples, detecting the instability in the input signals, such as a handwheel torque, a handwheel angle, a motor velocity, and the like includes filtering the input signal using a high order bandpass filter. Further, in one or more examples, determining the duration of the instability is based on the filtered input signal and a predicted input signal, the predicted input signal determined based on a vehicle speed. In one or more examples, a duration module switches ON one of a short instability flag and a long instability flag based on the duration of the instability being above a predetermined short duration and a predetermined long duration respectively. Further yet, in one or more examples, determining the severity of the instability includes comparing a magnitude of a filtered input signal with a plurality of predetermined thresholds corresponding to respective severity levels.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
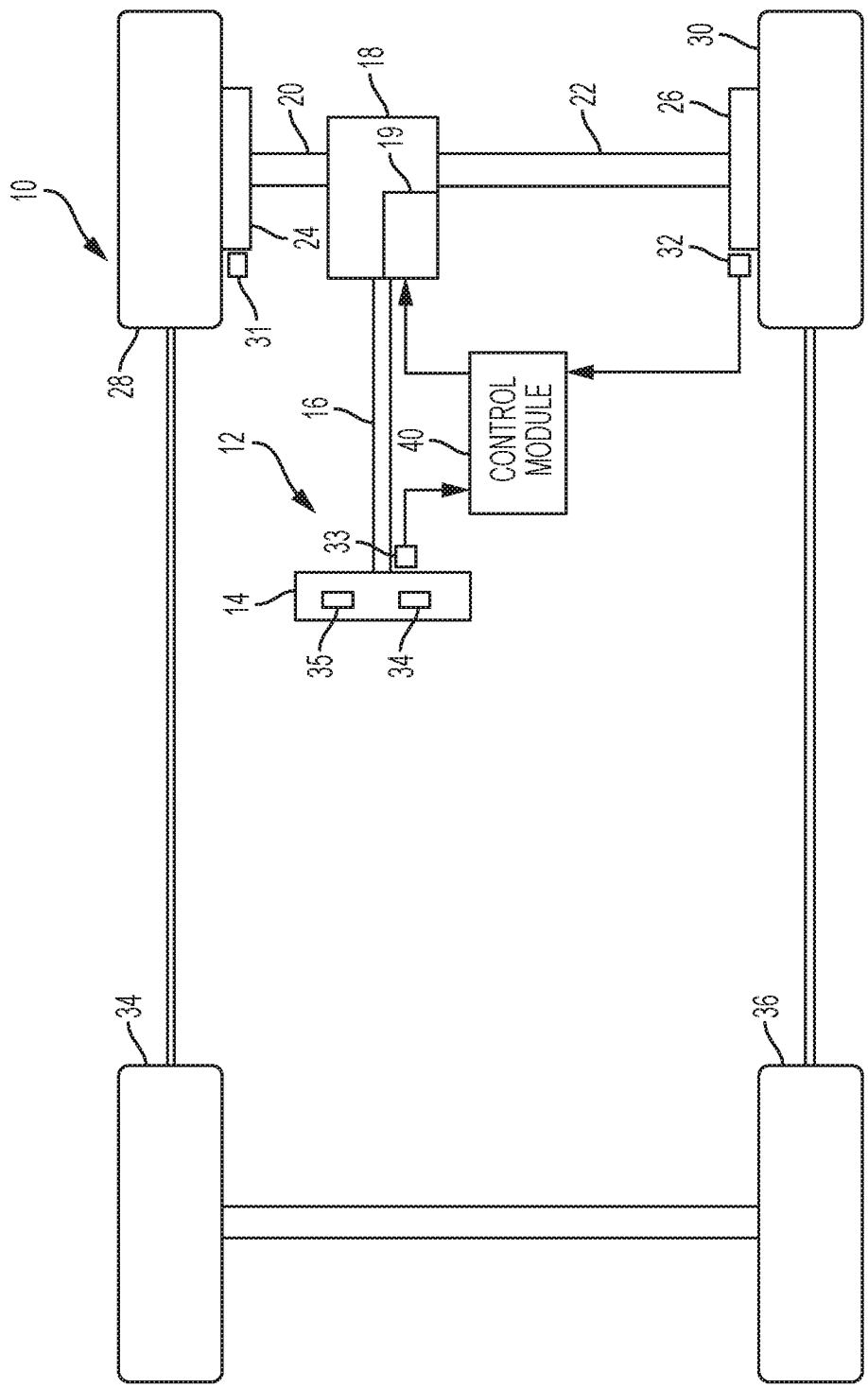
FIG. 1 illustrates a vehicle including a steering system, according to one or more embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments, an embodiment of a vehicle 10 including a steering system 12 such as an electrical power steering (EPS) and/or driver assistance system is illustrated. In various embodiments, the steering system 12 includes a handwheel 14 coupled to a steering shaft 16. In the embodiment shown, the steering system 12 is an electric power steering (EPS) system that further includes a steering assist unit 18 that couples to the steeling shaft 16 of the steering system 12 and to tie rods 20, 22 of the vehicle 10. The steering assist unit 18 includes, for example, a steering actuator motor 19 (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

The actuator motor 19 is a direct current (DC) electric machine or motor. In one embodiment, the motor 19 is a brushed DC motor. The brushed DC motor includes a stator and a rotor. The stator includes a brush housing having a plurality of circumferentially spaced brushes disposed about a commutator, each brush having a contact face that is in electrical contact with the commutator. Although embodiments described herein are applied to a permanent magnet brushed DC motor, they are not so limited and may be applied to any suitable DC machine.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal. In another example, the sensor 33 is a torque sensor that senses a torque placed on the handwheel 14. The sensor 33 generates torque signals based thereon. Other sensors include a position sensor 34 for detecting the position (motor position) and rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control). In one or more examples, the control module 40 facilitates the steering system 12 to implement a steer by wire system, where the handwheel 14 is not mechanically connected to one or more mechanical components of the vehicle during normal operation, such as the wheels. Furthermore, in such case, the handwheel includes angle sensor 35 and may include additional servo motor or actuator, and corresponding sensors, such as a position sensor 34. The steering system 12 uses steering assist unit 18 to control the lateral movement of tie-rods 20, 26 based on the handwheel's angle signal received by the control module 40. In such case, the steering shaft 16 may be absent or may have a clutch mechanism that allows handwheel to be mechanically disengaged from rest of the steering system or vehicle. A steer by wire system may have a closed loop control for steering assist unit 19's position control and handwheel unit 14's torque control. Hence, even for a steer by wire system, a real-time stability detection method will be useful.

Aspects of embodiments described herein may be performed by any suitable control system and/or processing device, such as the motor assist unit 18 and/or the control module 40. In one embodiment, the control module 40 is or is included as part of an autonomous driving system.

A processing or control device, such as the control module 40, addresses technical challenges described herein by implementing the technical solutions described herein. For example, a technical challenge in a steering system 12 is to ensure stability of steering system 12 during operation. To ensure stability of the steering system 12, a technical challenge is implementing a real-time method for stability monitoring and gain scaling.

As described earlier, the steering system 12 is a closed loop control system, where a closed-loop linear system is stable if output response is bounded for all bounded inputs. In case of the steering system 12, as is generally known, two parts affecting overall dynamics of the closed loop control process include calibration of controls and plant dynamics. The calibration of the controls can change with vehicle speed, handwheel torque, motor velocity etc. Furthermore, the plant dynamics can be affected by system friction, vehicle speed, temperature, nonlinearities etc. When these conditions change, the system transfer function changes too. Hence, a stability correlation process is typically used to determine and calibrate minimum required stability margin at various operating points. Although the stability margins are checked at multiple operating points of the steering system 12, the stability correlation assumes a non-variant linear plant model for the steering system 12. Further, control calibration assumes a non-variant response of the steering system 12. it is technically challenging and time consuming to study and cover multiple, and possibly all, factors affecting stability in practice, and tuning the steering system responses in advance.

Stability degradation in EPS system can result in unintended vibrations, for example due to stability margin decrease, in the handwheel 14 resulting in operator discomfort. Preventing such undesirable handwheel vibrations is a technical challenge addressed by the technical solutions described herein. It should be noted that various other technical challenges addressed by the technical solutions described herein can be determined by a person skilled in the art.

The technical solutions described herein address the technical challenges by facilitating a stability margin determination for the stability correlation process, which is directly responsible for the stability of the steering system 12. In one or more examples, the real-time stability margin is determined in addition to existing stability correlation process to ensure and further enhance stability of the steering system 12 while driving. The technical solutions described herein thus improve operations of steering systems and further enhance safety of passenger(s) and operator(s) of the vehicle 10.

The technical solutions described herein facilitate the steering system 12 and/or the vehicle 10 to detect internal instability of the steering system 12 and to be robust against wanted oscillations and external excitations provided to the steering system 12. For example, because stability related vibrations happen with a certain frequency area, a higher order Chebyshev bandpass filter is used to analyze the handwheel torque content at the same frequency range. Once stability related vibration is detected, the steering system 12 reduces assist gain to increase stability margins so that the operator is still able to drive safely. Besides, the technical solutions described herein facilitate learning a borderline assist gain to ensure system stability using an adaptive stability margin learning scheme. The steering system 12 applies this borderline assist gain to scale the original gain (of 1) on the final motor torque command. By doing this, the steering system 12 decreases tuning gains for multiple control loops such as torque open loop and velocity open loop.

In one or more examples, the technical solutions described herein facilitate detecting stability related vibrations in the steering system 12 and applying a scale factor to a motor command for generating torque according to vibration severity and vibration time length.

Figure 2:
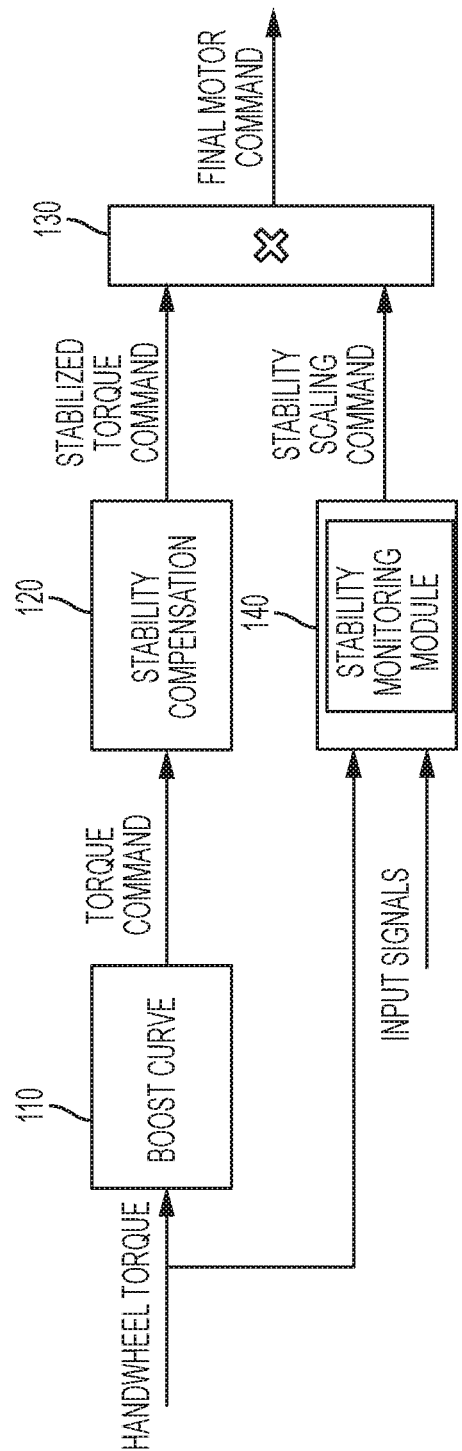
FIG. 2 depicts a stability monitoring system for a steering system according to one or more embodiments.

FIG. 2 depicts a stability monitoring system for a steering system according to one or more embodiments. A boost curve module 110 receives an input signal, such as a handwheel torque signal, a handwheel angle signal, a motor velocity signal, or the like, from one or more sensors 30-35 monitoring the steering system 12. The examples herein are described using the handwheel torque that is input to the handwheel 14 of the steering system 12 as the input signal, however, it should be noted that in other examples, the other input signals listed above are used as the input signal. The stability (or instability) detection and using the detected instability to determine a stability scaling factor to modify a torque command of the steering system 12, as described herein, are applicable with any of the input signals listed above, as well as any other input signal that may be used to compute a torque command for the steering system 12.

The handwheel torque is provided by the operator when operating the vehicle 10. The boost curve module 110 determines a torque command to scale the handwheel torque to generate an assist torque using the motor 19. In one or more examples, the assist torque scales the handwheel torque to facilitate maneuvering the vehicle 10 more easily by the operator by mechanically boosting the torque provided by the operator.

In one or more examples, a stability compensation module 120 receives the torque command generated by the boost curve module 110 and modifies the torque command according to predetermined tuning factors. The stability compensation module 120 generates a stabilized torque command. It should be noted that a motor velocity based damping command can also be added to the stabilized torque command to improve system performance.

The system depicted further includes a stability monitoring module 140 that monitors the stability (or instability) of the steering system 12 in real-time and generates a stability scaling factor to further scale the stabilized torque command using a scaling module 130. The scaling module 130 thus generates a final torque command for the motor 19 based on the stabilized torque command and the stability scale factor from the stability monitoring module 140. The motor command may be a current command or a voltage command provided to the motor 19 to cause the motor 19 to generate a corresponding amount of torque as the assist torque.

It should be noted that one or more of the modules depicted in FIG. 2 may be part of the control module 40 in one or more examples. Alternatively, or in addition, one or more of the modules may be implemented by the control module 40 using one or more computer executable instructions. Alternatively, or in addition, in one or more examples, one or more of the modules depicted may be separate from the control module 40 and send/receive one or more control signals to/from the control module 40 to implement the technical solutions described herein.

Figure 3:
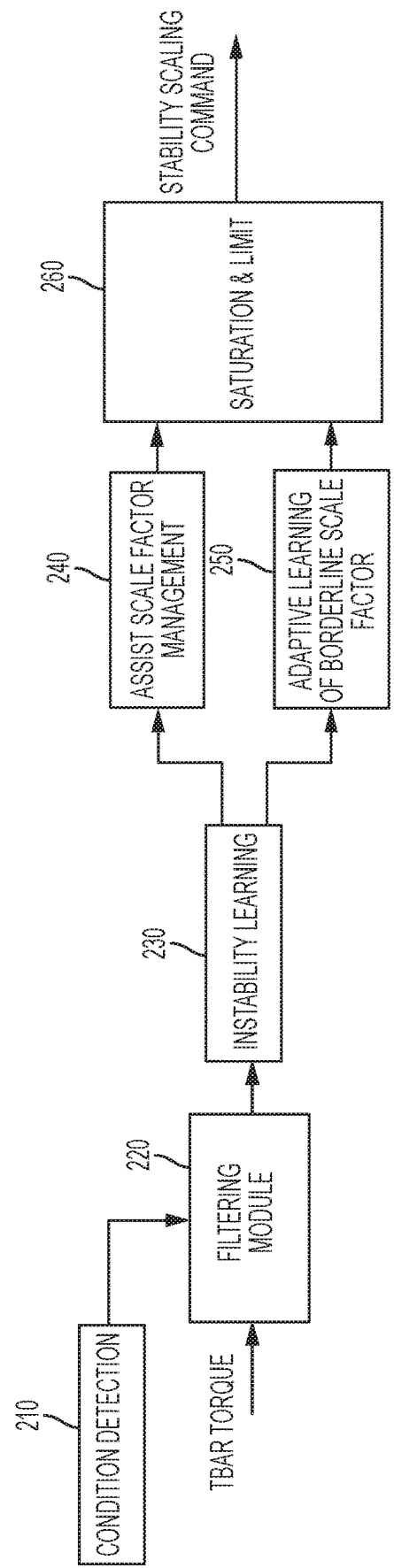
FIG. 3 depicts a block diagram of an example stability monitoring module according to one or more embodiments.

FIG. 3 depicts a block diagram of an example stability monitoring module according to one or more embodiments. In one or more examples, the stability monitoring module 140 generates the stability scaling factor by monitoring the handwheel torque (Tbar torque) and other input signals, such as handwheel position. In one or more examples, the stability monitoring module includes a condition detection module 210 that enables the stability monitoring functions based on the one or more input signals. When the stability monitoring is enabled, the handwheel torque signal is filtered by using a filter module 220, for example including a Chebyshev higher order band-pass filter. In one or more examples, the output of the Chebyshev filter is further processed and a low-pass filtered absolute value of the band-pass filtered handwheel torque is calculated.

The stability monitoring module 140 further includes an instability learning module 230 that monitors a vibration time length and severity based on the handwheel torque. Further, an assist scale factor management module 240 computes an assist gain, that is the stability scaling factor, according to the vibration time length and severity. In one or more examples, the stability scaling factor is processed by a saturation and limit module 260 to ensure that the scaling factor is within a predetermined range. For example, the stability scaling factor is limited to a [0, 1] range.

In one or more examples, the stability monitoring module 140 includes an adaptive learning module 250 that learns a borderline assist gain by an adaptive method. In one or more examples, the learned gain is applied as the upper limit of the range used by the assist gain saturation and limiting module 260 to limit the stability scaling factor.

Figure 4:
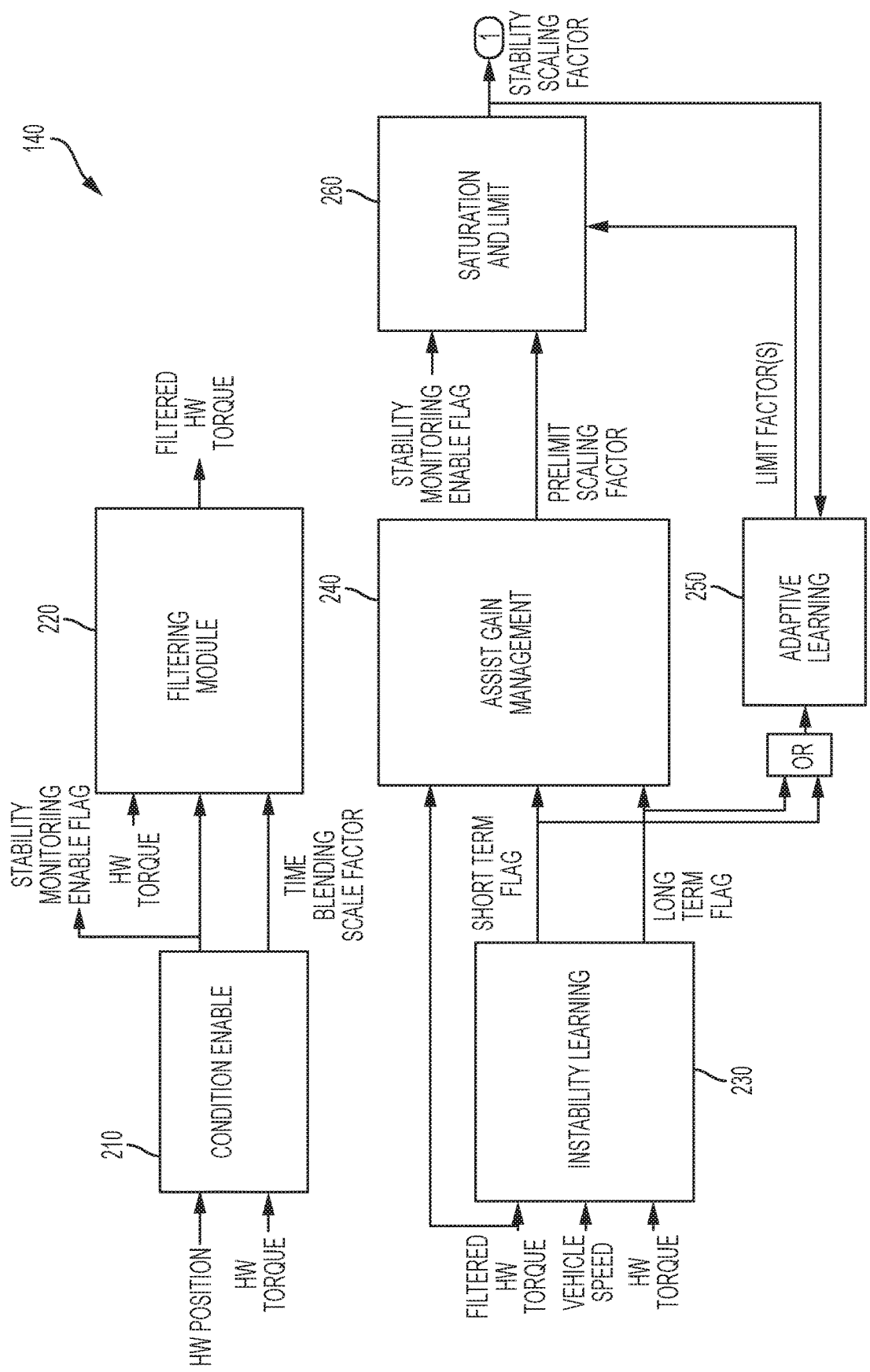
FIG. 4 depicts an example implementation of the stability monitoring module illustrating an example dataflow according to one or more embodiments.

FIG. 4 depicts an example implementation of the stability monitoring module 140 illustrating an example dataflow according to one or more embodiments. The condition detection module 210 receives the handwheel torque and the handwheel position input signals. The condition detection module 210 determines a stability monitoring enable flag based on the input signals.

Figure 5:
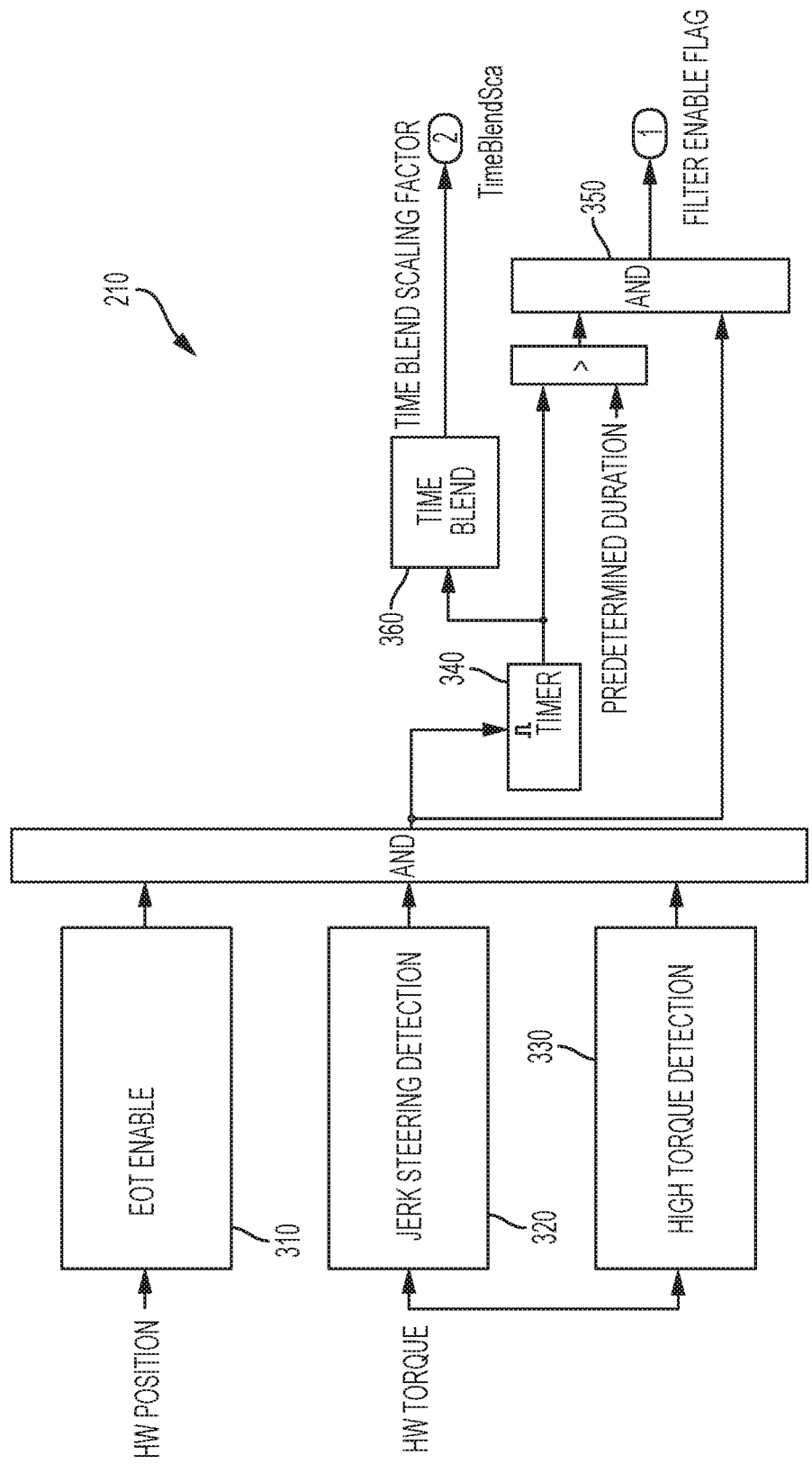
FIG. 5 depicts an example block diagram for the condition enable module according to one or more embodiments.

FIG. 5 depicts an example block diagram for the condition enable module according to one or more embodiments. The condition detection module 210 includes an End of travel (EOT) Enable module 310, which disables the real-time stability monitoring function when the absolute value of the hand wheel angle exceeds a stored EOT angle value. In one or more examples, the EOT module 310 uses the handwheel position. Alternatively, or in addition, the EOT module 310 uses a motor position.

The condition detection module 210 includes a jerk steering detection module 320, which detects if the driver is rotating the hand wheel at a higher rate/frequent, than a predetermined rate/frequency.

Further, the condition detection module 210 includes a high torque detection module 330, which detects if the absolute value of handwheel torque is within a predetermined threshold from a saturation value.

If the input signals satisfy any one of the three conditions of these respective modules from the condition detection module 210, the real-time stability monitoring function of the stability monitoring module 140 is disabled. In one or more examples, if the function is disabled, the band-pass filtered handwheel torque is replaced with 0 so that the stability monitoring module 140 temporarily stops detecting any vibration.

The condition detection module 210 further generates a time blending scaling factor. In one or more examples, the time blending scaling factor is based on the amount of time at least one of the conditions of EOT, high torque, and jerk, is detected. The condition detection module 210 includes a timer 340 that monitors the duration for which at least one of the conditions is true. If the amount of time the condition is true exceeds a predetermined amount, the real-time stability monitoring function is disabled.

In one or more examples, the condition detection module 140 disables the real-time stability monitoring function if one of the conditions is true for at least the predetermined duration. Accordingly, the condition detection module 140 includes a binary logic module 350 that performs an AND operation to determine if one of the conditions is currently true, and if one of the conditions has been true for at least the predetermined duration. The result of the AND operation, filtering-enable flag, is forwarded to the filtering module 220. The filtering-enable flag is a binary value. In one or more examples, if the filtering-enable flag resulting from the AND operation is true, the filtering module 220 processes the input signals, else the result of the filtering module 220 is replaced with 0 (zero).

In addition, the timer 340 also monitors an amount of time none of the conditions is true. Based on the amount of time the conditions are not true, a time blend module 360 generates the time blend scaling factor. The time blend module 360, in one or more examples, uses a look-up table to determine the time blend scaling factor based on the duration for which the conditions have not been detected.

Referring back to FIGS. 3 and 4, the results from the condition detection module 210 is forwarded to the filtering module 220. The filtering module 220 further receives other input signals, such as the handwheel torque received at the handwheel 14. The filtering module 220 processes the handwheel torque based on the inputs from the condition detection module 210 to determine a filtered handwheel torque signal to generate the stability scaling factor.

Figure 6:
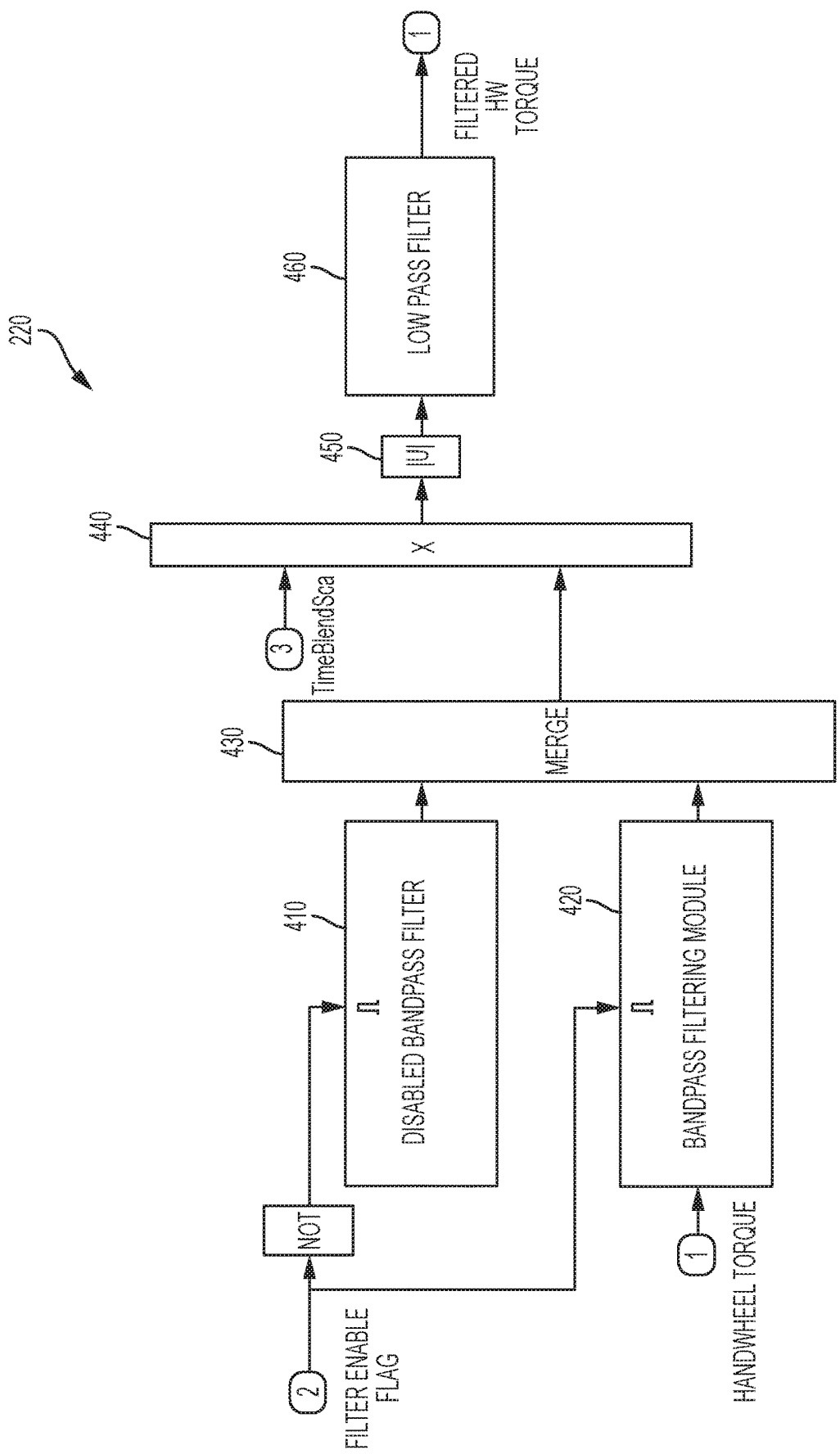
FIG. 6 depicts an example block diagram for the filtering module according to one or more embodiments.

FIG. 6 depicts an example block diagram for the filtering module according to one or more embodiments. The filtering module 220 includes a disabled filtering module 410 that receives the filter enable flag output from the condition detection module 210. If the filter enable flag is false, the disable bandpass filtering module 410 is enabled, and outputs a 0 (zero) or any other predetermined value indicative that the filtering module 220 has stopped detecting any vibrations at the handwheel 14.

Further, the filtering module 220 includes a bandpass filtering module 420, which implements a high-order Chebyshev bandpass filtering, or any other bandpass filter. The higher the order of the bandpass filtering used by the bandpass filtering module 420, the sharper the edge of the filtering, however the more time required for the processing. In one or more examples, the bandpass filtering module uses a 6th order Chebyshev filtering, with a predetermined lower threshold frequency (e.g. fL=20 Hz), and a predetermined higher threshold frequency (e.g. fH=70 Hz). The bandpass filtering module 420 is enabled based on the filter enable flag from the condition detection module 210. The bandpass filtering module 420 receives the handwheel torque signals and filters the signals within the range of the predetermined threshold frequencies.

In one or more examples, the output from the disabled filtering module 410 and the bandpass filtering module 420 are provided to a merge module 430. The merge module sends appropriate output from either 410 or 420 out depending upon which block is enabled based on Filter Enable Flag signal.

The filtering module 220 further includes a scaling module 440 that receives the output from the merge module 430 and scales the output using the time blend scaling factor from the condition detection module 210.

The filtering module 220 further includes an absolute value module 450 and a low pass filtering module 460 to compute the low-pass filtering of the absolute value of the bandpass filtered handwheel torque. The value of final output thus provides a magnitude of how much content is present in the frequency range of the bandpass filtering module 420. The predetermined frequency range of the bandpass filtering module 420 corresponds to stability related frequency range for the steering system 12.

Referring back to the FIG. 3 and FIG. 4, the output filtered handwheel torque from the filtering module 220 is forwarded to the instability learning module 230 and the assist scale factor module 240. The instability learning module 230 receives additional input signals, such as vehicle speed and the raw handwheel torque signals (prior to filtering) and sets values for a short instability flag and a long instability flag. The assist scale factor module 240 receives the filtered handwheel torque from the filtering module 220 and the flag values from the instability learning module 230.

Figure 7:
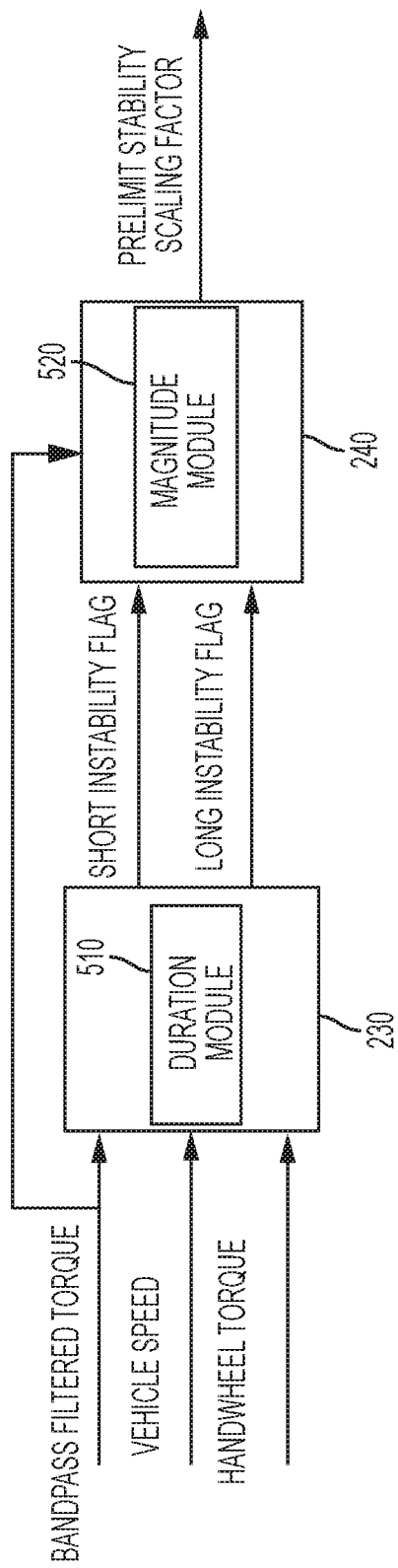
FIG. 7 depicts a block diagram of an example instability learning module and the assist scale factor module according to one or more embodiments.

FIG. 7 depicts a block diagram of an example instability learning module and the assist scale factor module according to one or more embodiments. The instability learning module 230 includes a duration module 510 and the assist scale factor module 240 includes a magnitude module 520, among other components. Based on the input signals the duration module 510 generates a short instability flag and a long instability flag indicative of a duration for which instability has been detected. Further, based on the input signals, and the flags generated by the duration module 510, the magnitude module 520 generates a prelimit stability scaling factor.

Figure 8:
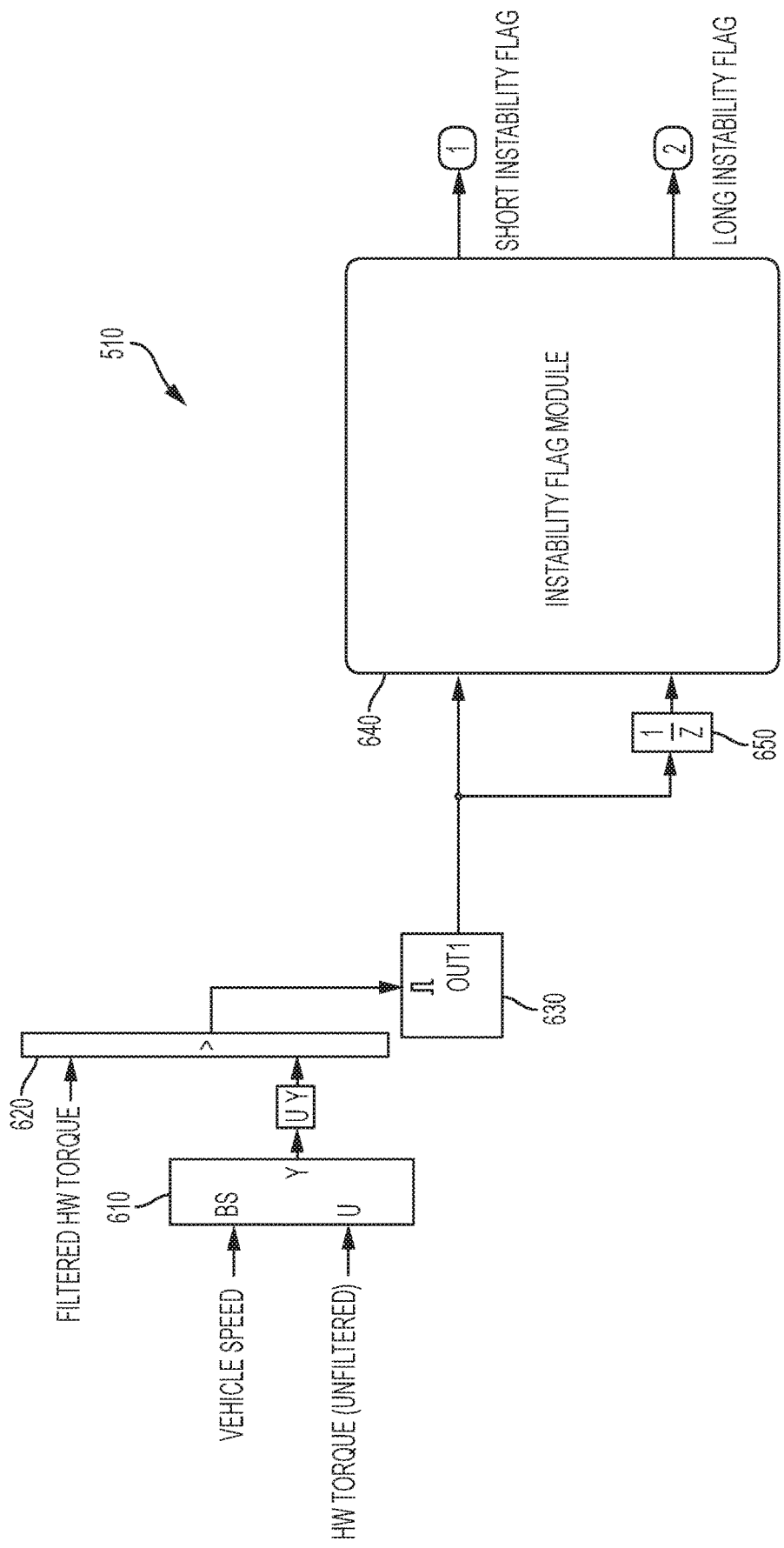
FIG. 8 depicts a block diagram for an example duration module according to one or more embodiments.

FIG. 8 depicts a block diagram for an example duration module according to one or more embodiments. The duration module 510 determines a time length of the vibration identified in the handwheel torque data from the filtering module 220. Thus, the filtering module 220 facilitates determining the amplitude of an instability contained in the handwheel torque signals, and the duration module 510 determines a duration of the instability.

In one or more examples, the duration module 510 determines if the steering system 12 has a short time instability or a long time instability. The duration module 510 indicates the result using two corresponding flags, short instability flag and long instability flag, which are binary values. The duration module 510 includes an instability threshold module 610 that computes an instability calibration value based on unfiltered handwheel torque and vehicle speed. The duration module 510 further includes a comparer 620 and a timer 630 that determine a time duration for which the amplitude of the filtered handwheel torque value is greater than the instability calibration value. If the amplitude is higher than the instability calibration value for more than a calibratable period of time 1 but lower than a calibratable period of time 2, the short instability flag is turned ON and the long instability flag is OFF. When the amplitude is higher than the instability calibration value for more than the calibratable period of time 2, the short instability flag is turned OFF and the long instability flag is turned ON.

The duration module 510 further includes an instability flag module 640 that sets the short instability flag and the long instability flag values. The instability flag module 640 receives the current output of the timer 630 and whether the amplitude is greater than the instability calibration value. The instability flag module 640 also receives a result of whether the amplitude was greater than the instability calibration value in the previous iteration, using a unit delay module 650. If the output of 650 is same as output of 630, short instability flag and long instability flag are set to zero. Accordingly, the instability flag module 640 determines whether the amplitude has been greater the instability calibration value for more than the calibratable period of time 1 and/or 2. Based on the determination, the instability flag module 640 changes the status of the short and long instability flags. In one or more examples, the instability flag module 640 resets both the flags to OFF when the amplitude falls below the instability calibration value. Further, in one or more examples, the instability flag module 640 sets the flags to OFF when the steering system 12 starts up, for example, when the vehicle 10 starts up.

Referring back to FIG. 7, the short instability flag and the long instability flag values are forwarded from the duration module 510 to the magnitude module 520. The magnitude module 520, based on the flag values, and the amplitude of the filtered handwheel torque from the filtering module 220 generates the prelimit stability scale factor.

Figure 9:
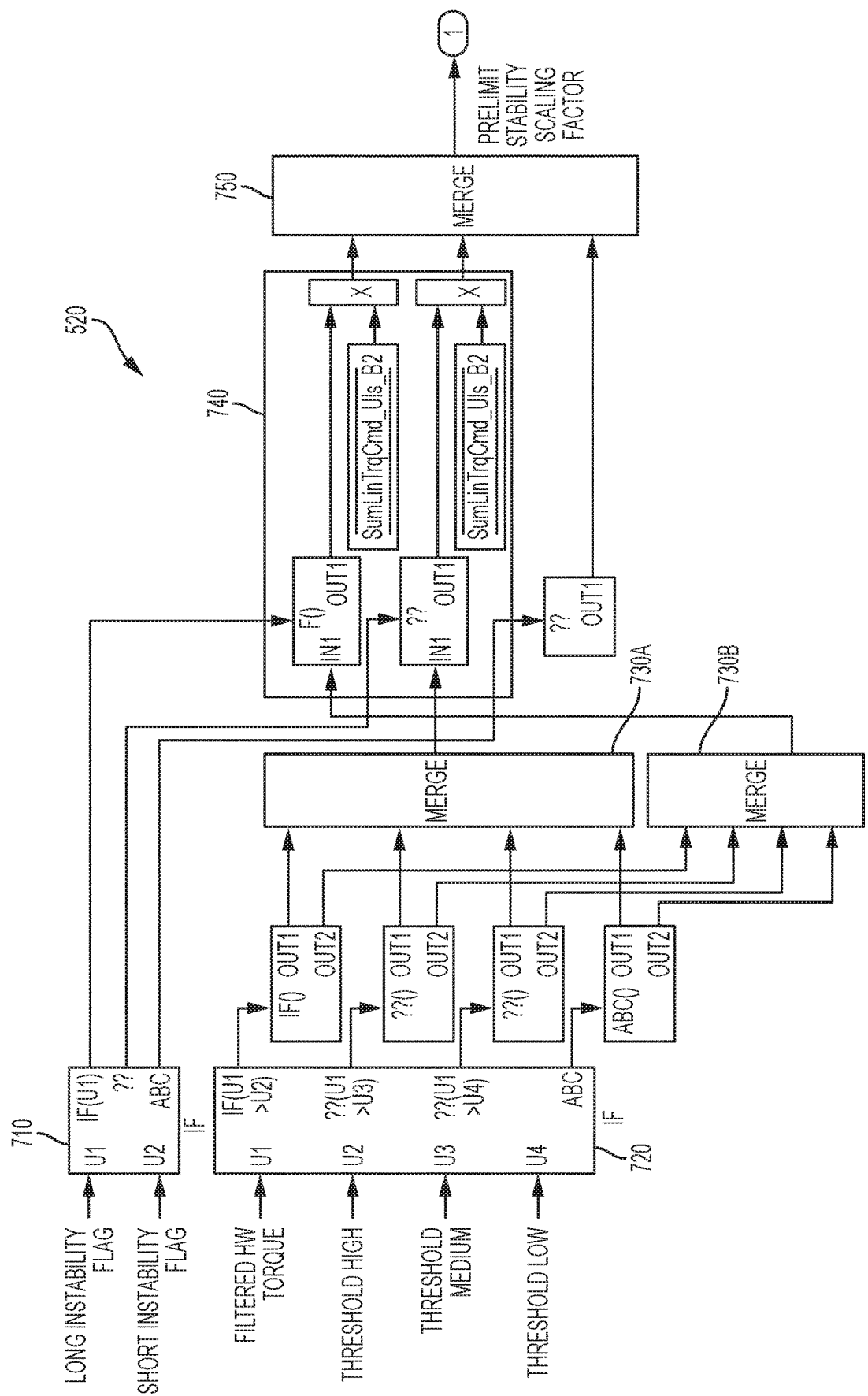
FIG. 9 depicts a block diagram of an example magnitude module 520 according to one or more embodiments.

FIG. 9 depicts a block diagram of an example magnitude module 520 according to one or more embodiments. The magnitude module 520 includes a flag check module 710 that receives and checks the values of the short instability flag and the long instability flag. Further, the magnitude module 520 includes a threshold check module 720 that receives and compares the filtered handwheel torque with one or more predetermined threshold values.

Based on the comparison of the threshold check module 720 with the different threshold values, arbitration modules 730A and 730B determine a value for the prelimit scaling factor. For example, the threshold check module 720 checks if the filtered handwheel torque value is greater than a first threshold value (high), a second threshold value (medium), and a third threshold value (low). Depending upon which case was true, two predetermined scale factors (one for long instability flag condition to 730B, and other one for short instability flag condition to 730A) are sent out to 730 modules. In one or more examples, the arbitration modules 730A and 730B determine the prelimit scaling factor using a lookup table based on the comparison results. The threshold check module 710 and the arbitration modules 730A and 730B thus determine prelimit scaling factor values based on the magnitude of the filtered handwheel torque and long/short instability flags. It should be noted that in one or more examples, instead of the two arbitration modules shown, a single arbitration module, or a different number of arbitration modules may be used.

The outputs of the arbitration modules 730A and 730B are forwarded to a duration based multiplier module 740. The duration based multiplier module 740 receives the results from the flag check module 710 and the prelimit scaling factor values from the arbitration modules 730A and 730B. Based on the outputs from the flag check module 710, the duration based multiplier module 740 multiplies the prelimit scale factor with a gain multiplier. The flag check module 710 calibrates the gain multiplier based on the flag values from the duration module 510. If the instability lasts for a short period of time (short instability flag is ON), the assist gain multiplier is calibrated to a first predetermined value that is higher than a second predetermined value used if the instability lasts for a long period of time (long instability flag is ON). If neither flag is ON, that is both flags are OFF, the prelimit scaling factor is a predetermined value, such as 1.

Further, in one or more examples, a higher amplitude of instability content is scaled using a lower assist gain multiplier. For example, if the filtered handwheel torque value is above the higher threshold value, the lower assist gain multiplier is used, while the higher gain multiplier is used in other cases. In other examples alternative computations may be performed.

In one or more examples, the magnitude module 520 further includes a merge module 750 that receives the prelim scale factor values from the duration multiplier module 740 and the predetermined value for the different cases based on the flag values from the duration module 510. The merge module 750 passes appropriate prelimit stability scaling factor out of the 3 inputs depending upon which condition holds true based on logic implemented in 710.

Referring back to FIGS. 3 and 4, the prelimit stability scaling factor is forwarded to the saturation and limit module 260. The saturation and limit module 260 receives the stability monitoring enable flag from the condition enable module 210, a binary value. If the monitoring enable flag is set to OFF, the saturation and limit module 260 outputs a 1 as the stability scaling factor, in turn switching off the real-time stability scaling monitoring and reduced scaling.

In addition, the saturation and limit module 260 compares the prelimit stability scaling factor with a limit factor, which is a predetermined maximum value for the stability scaling factor. The saturation and limit module 260 ensures that the predetermined maximum value is enforced. Further, in one or more examples, the saturation and limit module 260 also enforces a predetermined minimum value for the stability scaling factor.

In one or more examples, the saturation and limit module 260 receives the limit factors with which to compare the prelimit stability scaling factor from the adaptive learning module 250.

Figure 10:
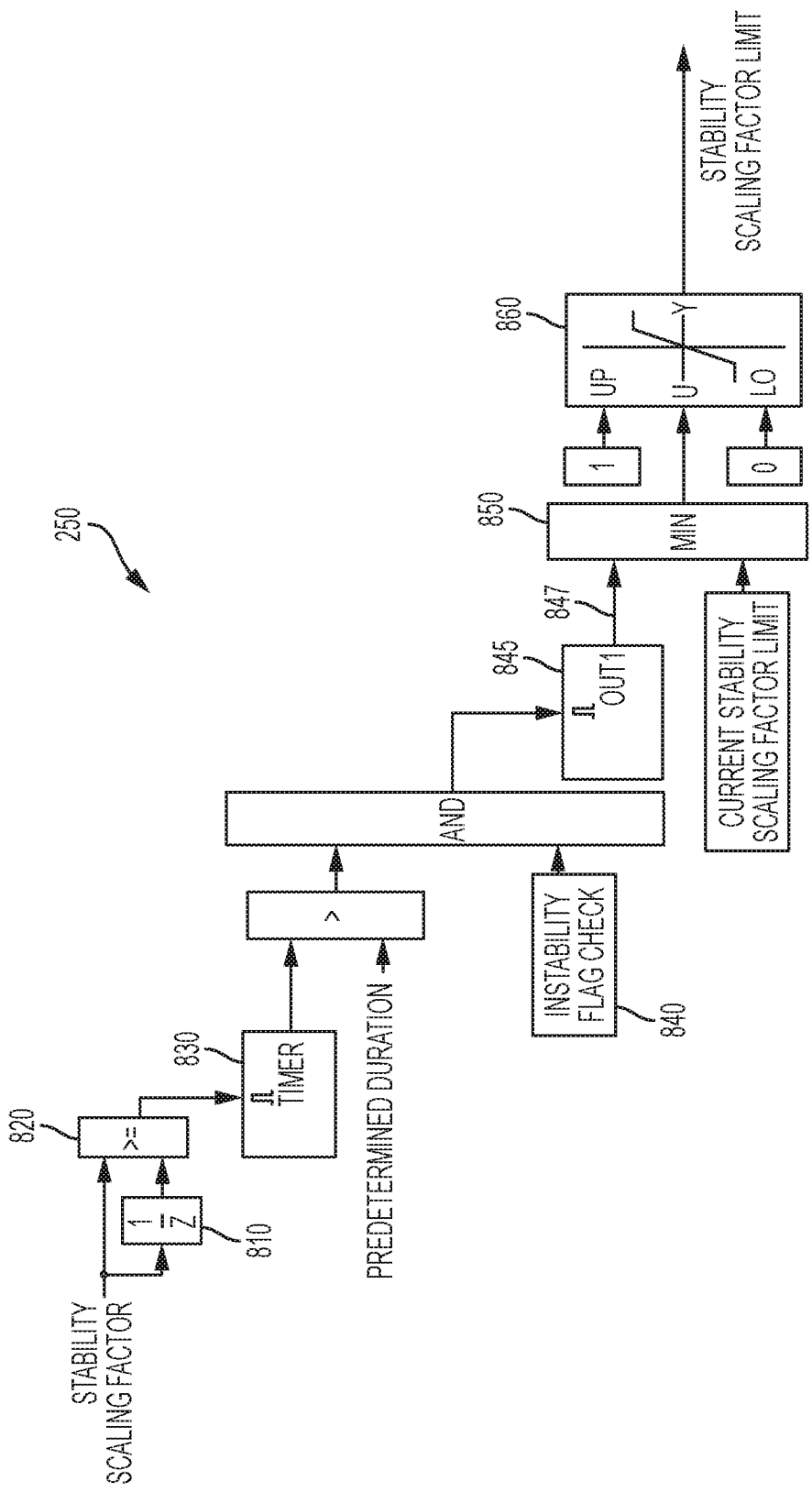
FIG. 10 depicts a block diagram of an example adaptive learning module according to one or more embodiments.

FIG. 10 depicts a block diagram of an example adaptive learning module according to one or more embodiments. The adaptive learning module 250 learns the borderline assist gain for steering system 12, which can vary from one system to another, and even as the steering system 12 is used over time. In the illustrated implementation of the adaptive learning module 250, if instability is not detected in the previous loop time but detected at the current loop time, the limit factor for the stability scaling factor is set as the minimum of current assist gain upper limit and the difference of current assist gain and a small calibration value (predetermined). For example, the small calibration value may be 0.1, or any other such value, or a ratio, such as 10% to calculate the value to be subtracted based as the ratio of the current assist gain itself As depicted, a unit delay module 810 and a comparer 820 compare if the current stability scaling factor value is greater than the previous stability scaling factor value. If the previous stability scaling factor value is greater, the limit factors are not changed at this time. If the current stability scaling factor value is greater (or equal), a timer 830 is initiated. The timer 830 determines whether the current stability scaling factor value is increasing for at least a predetermined amount of time. Further, the adaptive learning module 250 includes an instability flag check module 840 that checks if at least one of the short instability flag and the long instability flag are ON. If both conditions are satisfied, at least one of the instability flags is ON, and the stability scaling factor has increased for at least the predetermined duration, a limiting factor determination module 845 is enabled that outputs a current limiting factor; otherwise it holds output to previously calculated current limiting factor. When the enable block receives the TRUE enable flag, it subtracts a predetermined value such as 0.05 from current stability scaling factor which is one sample time delayed value of output (Stability Scaling Factor Limit) from block 250.

In one or more examples, the arbitration module 850 compares the currently calculated limiting factor 847 from the limiting factor determination module 845 with the current scaling factor and takes the minimum of the two as the updated limiting factor. The adaptive learning module 250 further includes a saturation and limit module 860 that ensures that the updated limiting factor is within the predetermined range for the stability scaling factor, such as [0, 1].

Figure 11:
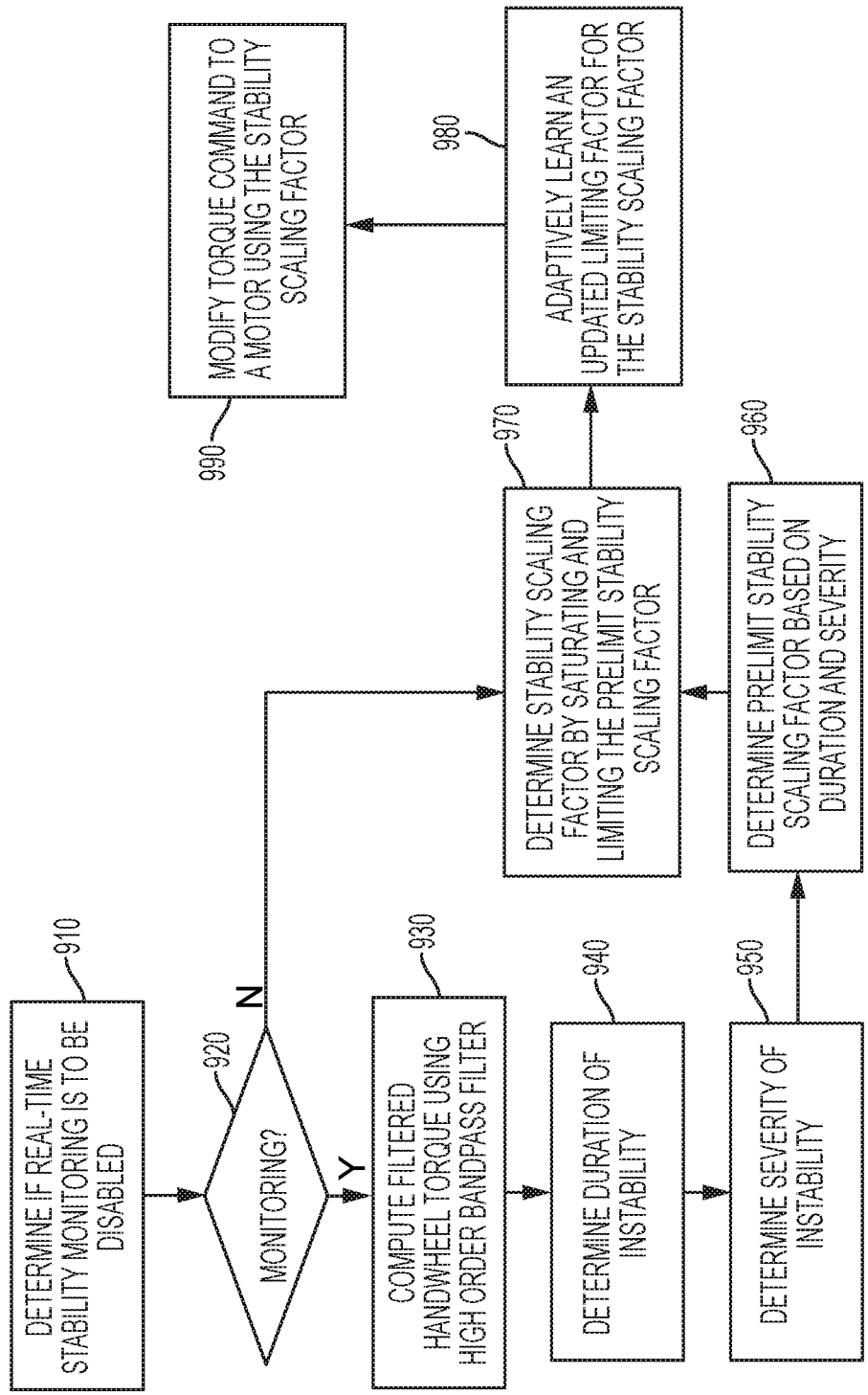
FIG. 11 depicts a flowchart for an example method for real-time stability monitoring and gain scaling according to one or more embodiments.

FIG. 11 depicts a flowchart for an example method for real-time stability monitoring and gain scaling according to one or more embodiments. As described herein, the method may be implemented in a system that uses a motor to generate a torque based on an input torque, such as in the steering system 12 where the motor 19 generates an assist torque based on a torque command that in turn is based on a handwheel torque value. The method and other embodiments described herein monitor for any instability in the handwheel torque signal being received and compensate for such instability by modifying the torque command using a stability scaling factor. Further, the embodiments facilitate adaptively learning limiting factors to use for the scaling factor to prevent the system from scaling the torque command repeatedly.

The method includes determining if real-time stability monitoring is to be disabled, as shown at block 910. For example, the real-time stability monitoring is disabled in case a purposeful vibration, such as for haptic feedback, is generated at the handwheel 14. The haptic feedback includes a vibration or buzz at the handwheel 14 as a notification to the operator, for example in case of a failed component, a high speed, a navigation update, or any other type of feedback that is to be provided to the operator during operation of the vehicle 10. Alternatively, or in addition, the real-time stability monitoring is disabled based on other factors, such as a position of the handwheel 14, torque value, torque change rate, a vehicle speed, and the like (for example, see FIG. 5).

If real-time stability monitoring is to be performed, the method includes computing a filtered handwheel torque using high order bandpass filter, as shown at block 920 and 930. The filtering module 220 computes the filtered handwheel torque value, for example using high-order Chebyshev bandpass filtering. The bandpass filtered output is passed through a low pass filter and an absolute value module to determine the output filtered handwheel torque value that provides a magnitude of the instability detected in the received handwheel torque.

Further, the method includes determining duration of instability in the handwheel torque, as shown at block 940. For example, the duration module 510 determines the duration of the instability by using a timer. The duration module 510 compares the duration with predetermined amounts of time to determine if the instability is short or long and turns ON the appropriate flags—short instability flag, or the long instability flag.

Further, the method includes determining a severity of the instability, as shown at block 950. For example, the magnitude module 520 determines a severity of the instability by comparing the magnitude of the instability with one or more predetermined threshold values corresponding to one or more severity levels, for example, high, medium and low.

The method further includes determining a prelimit stability scaling factor based on the duration and severity of the instability, as shown at block 960. For example, the assist scale factor management module 240 checks the status of the instability flags and the severity level to determine a gain multiplier (for example, see FIG. 9). The prelimit stability scaling factor is multiplied with the gain multiplier that is determined based on the duration and severity of the instability. In one or more examples, the prelimit stability scaling factor is set to a predetermined value if the instability is shorter than even the predetermined duration used for the short instability flag.

Further, the method includes determining a stability scaling factor by saturating and limiting the prelimit stability scaling factor according to a limiting factor, as shown at block 970. Further, the method includes adaptively learning an updated limiting factor for the stability scaling factor, as shown at block 980. For example, if instability is not detected in the previous loop time but detected at the current loop time, the updated limiting factor is set to the minimum of current assist gain upper limit and the difference of current assist gain and a small calibration.

The method further includes modifying a torque command to the motor 19 using the stability scaling factor, as shown at block 990. The torque command causes the motor 19 to generate an assist torque in response to the handwheel torque input to maneuver the vehicle 10.

Figure 12:
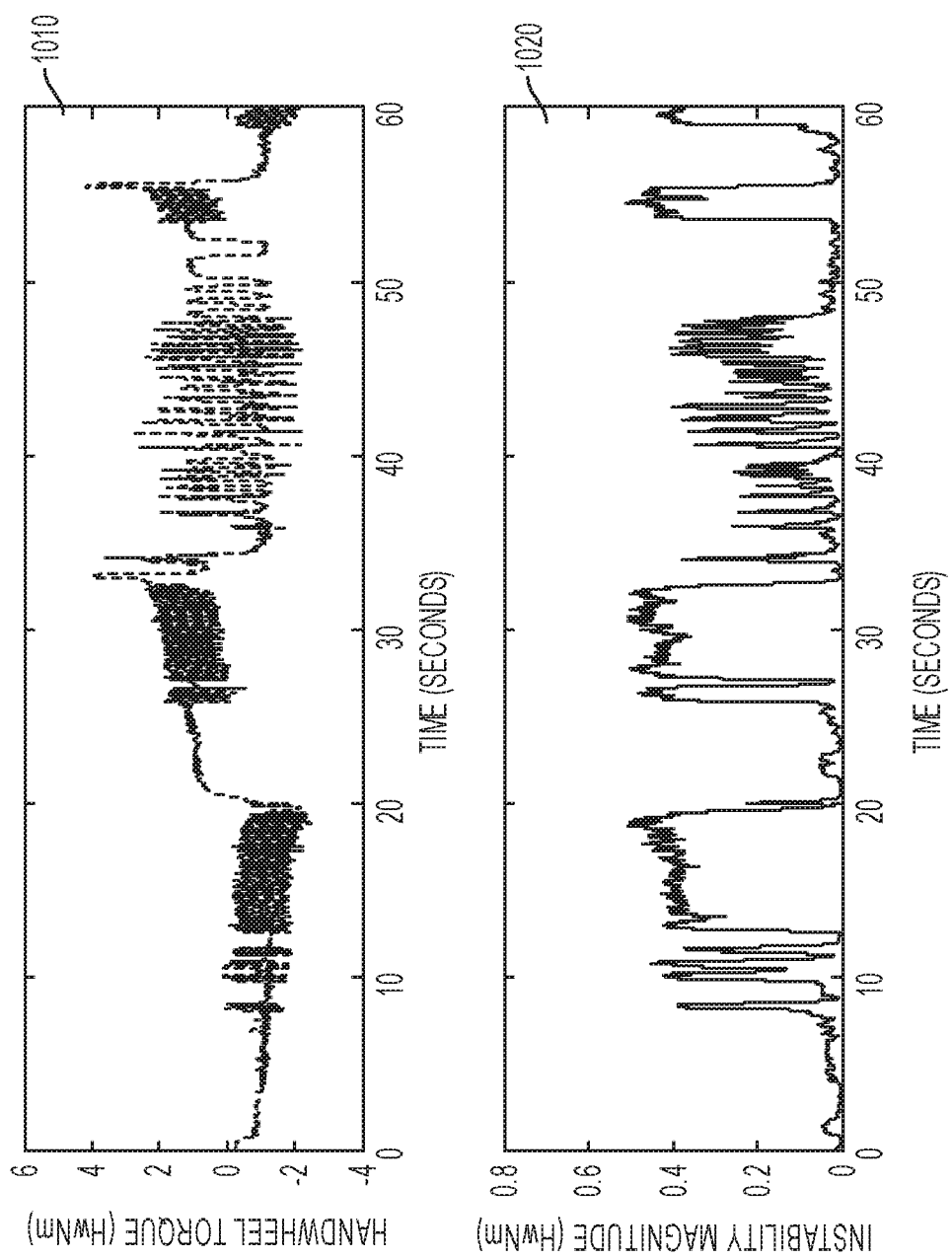
FIG. 12 depicts an example graph illustrating instability detection according to one or more embodiments.

FIG. 12 depicts an example graph illustrating instability detection according to one or more embodiments. As can be seen, using the one or more embodiments described herein, an instability in the handwheel torque signal shown in plot 1010 is isolated, and a duration and severity (based on magnitude) is determined as shown in plot 1020. Based on the duration and severity a stability scaling factor is determined which is used to scale the torque command used to generate the assist torque.

The technical solutions described herein thus facilitate detecting whether to disable real-time stability monitoring. For example, the condition detection may identify haptic feedback vibrations, external disturbances, and high frequency driver input and use a flag to disable the real-time stability (or instability) detection.

Further, the technical solutions facilitate the stability (or instability) detection based on the received handwheel torque signals. For example, the technical solutions use a higher order Chebyshev bandpass filter to isolate stability related vibrations in the handwheel torque signals using robust cutoff frequencies. Further, the technical solutions described herein facilitate determining system instability level by using amplitude and time thresholds. Further yet, the technical solutions described herein facilitate adaptive learning of a borderline scale factor.

The technical solutions described herein thus improve a steering system by increasing stability for both torque loop and velocity loop when generating an assist torque using a motor.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
a processor; and
a memory including instructions that, when executed by the processor, cause the processor to:
compute an assist torque command;
compute a stabilized torque command based on one or more sensor measurements, the stabilized torque command modifying the assist torque command;
compute a stability scaling factor to adjust the stabilized torque command based on a duration and severity of an instability detected in the sensor measurements, the steering system being a manually controlled electrical power steering (EPS) system;
apply a high order bandpass filter to detect the instability in the one or more sensor measurements;
determine a duration of the instability in the one or more sensor measurements based on at least a predicted input, the predicted input being determined based on a vehicle speed;
learn a borderline assist gain of the steering system and determine an upper limit of a range of the stability scaling factor based on the learned borderline assist gain;
disable the computing the stability scaling factor based on at least one of a handwheel position, a handwheel jerk detection, and the one or more sensor measurements being above a predetermined threshold;
generate a blend scaling factor based on a duration that the at least one of the handwheel position, the handwheel jerk detection, and the one or more sensor measurements is above the predetermined threshold, the stabilized torque command being adjusted based on the blend scaling factor in response to the stability monitoring module being disabled;
generate a prelimit stability scaling factor based on at least an input value;
multiply the prelimit stability scaling factor with a gain multiplier, the gain multiplier being determined based on at least the duration of the instability; and
determine the stability scaling factor by at least limiting, according to a limiting factor, the multiplied prelimit stability scaling factor.

2. The steering system of claim 1, wherein the instructions further cause the processor to determine whether the stability scaling factor is within the range.

3. The steering system of claim 1, wherein the instructions further cause the processor to determine a threshold torque value, the threshold torque value determined based on at least the vehicle speed.

4. The steering system of claim 3, wherein the instructions further cause the processor to switch ON one of a short instability flag and a long instability flag based on the duration of the instability being above a predetermined short duration and a predetermined long duration respectively.

5. The steering system of claim 1, wherein the instructions further cause the processor to determine the severity of the instability by comparing a magnitude of a filtered handwheel torque value with a plurality of predetermined thresholds corresponding to respective severity levels.

6. The steering system of claim 1, wherein the one or more sensor measurement values includes at least one of a handwheel torque, a motor velocity, and a handwheel angle.

7. A real-time stability monitoring system for a steering system, the real-time stability monitoring system comprising:
   a processor; and
   a memory including instructions that, when executed by the processor, cause the processor to:
   compute a filtered input signal from an input signal that is used to determine an assist torque command and magnitude of an instability in the input signal from the filtered input signal;
   apply a high order bandpass filter to compute the magnitude of instability in the input signal;
   determine a duration of the instability in the input signal based on at least a predicted input, the predicted input being determined based on a vehicle speed;
   determine a severity of the instability;
   determine a stability scaling factor to adjust the assist torque command of the steering system based on the duration and the severity of the instability in the input signal, the steering system being a manually controlled electrical power steering (EPS) system;
   learn a borderline assist gain of the steering system and determine an upper limit of a range of the stability scaling factor based on the learned borderline assist gain;
   disable the assist scale factor module based on at least one of a handwheel position, a handwheel jerk detection, and the input signal being above a predetermined threshold;
       generate a blend scaling factor based on a duration that the at least one of the handwheel position, the handwheel jerk detection, and the input signal is above the predetermined threshold, the assist torque command being adjusted based on the blend scaling factor in response to the assist scale factor module being disabled;
       generate a prelimit stability scaling factor based on at least an input value;
       multiply the prelimit stability scaling factor with a gain multiplier, the gain multiplier being determined based on at least the duration of the instability; and
       determine the stability scaling factor by at least limiting, according to a limiting factor, the multiplied prelimit stability scaling factor.

8. The real-time stability monitoring system of claim 7, wherein the input signal is a handwheel torque signal.

9. The real-time stability monitoring system of claim 7, wherein the input signal is a handwheel angle signal.

10. The real-time stability monitoring system of claim 7, wherein the input signal is a motor velocity signal.

11. The real-time stability monitoring system of claim 7, wherein the instructions further cause the processor to determine whether the stability scaling factor is within the range.

12. A computer implemented method for scaling a stability signal in a manually controlled electrical power_steering system, the method comprising:
   computing an assist torque command to cause a motor of the steering system to generate an assist torque;
   computing a stabilized torque command based on an input signal, the stabilized torque command modifying the assist torque command;
   computing a stability scaling factor to adjust the stabilized torque command based on a duration and severity of an instability detected in the input signal;
   applying a high order bandpass filter to detect the instability in the input signal;
   determining a duration of the instability in the input signal based on at least a predicted input, the predicted input being determined based on a vehicle speed;
   computing an upper limit of a range of the stability scaling factor based on a learned borderline assist gain learned by the adaptive learning module;
   disabling the stability monitoring module based on at least one of a handwheel position, a handwheel jerk detection, and the input signal being above a predetermined threshold;
   generating a blend scaling factor based on a duration that the at least one of the handwheel position, the handwheel jerk detection, and the input signal is above the predetermined threshold, the stabilized torque command being adjusted based on the blend scaling factor in response to the stability monitoring module being disabled
   generate a prelimit stability scaling factor based on at least an input value;
   multiply the prelimit stability scaling factor with a gain multiplier, the gain multiplier being determined based on at least the duration of the instability; and
   determine the stability scaling factor by at least limiting, according to a limiting factor, the multiplied prelimit stability scaling factor.

13. The method of claim 12, further comprising adaptively determining whether the stability scaling factor is within the range.

14. The method of claim 12, wherein the input signal is a handwheel torque signal.

15. The method of claim 12, wherein the input signal is a handwheel angle signal.

16. The method of claim 12, wherein the input signal is a motor velocity signal.

* * * * *